Feb. 13, 1962 N. C. BOECKER 3,020,675
GOOSE CALLER
Filed March 21, 1960

INVENTOR.
NEVELYN C. BOECKER
BY
*Malcolm W. Fraser*
ATTORNEY

United States Patent Office 3,020,675
Patented Feb. 13, 1962

3,020,675
GOOSE CALLER
Nevelyn C. Boecker, Toledo, Ohio
(810 N. Cousino Road, Oregon, Ohio)
Filed Mar. 21, 1960, Ser. No. 16,245
1 Claim. (Cl. 46—180)

This invention relates to goose callers.

Heretofore many efforts have been made to produce a goose caller closely simulating that of the bird and, although a certain degree of success has been achieved, no one to the best of my knowledge has produced a goose caller which can in quick succession produce a series of calls of different tone qualities, such as would be emitted by a flock of geese. Each goose has a somewhat different tone to its "chuckle" and experience has shown that the closer the "chuckle" or call approaches that of the goose, the more responsive they become and this is particularly true when successive calls are made by different tonal values.

An object is to produce a goose caller which can be manually manipulated so that a rapid succession of calls can be made affording different tones and thus establishing a more effective call for hunters' use.

Other objects and advantages of the invention will hereinafter appear, and for purposes of illustration, but not of limitation, an embodiment is shown on the accompanying drawings, in which FIGURE 1 is a side elevation of the goose caller;

Figure 1:
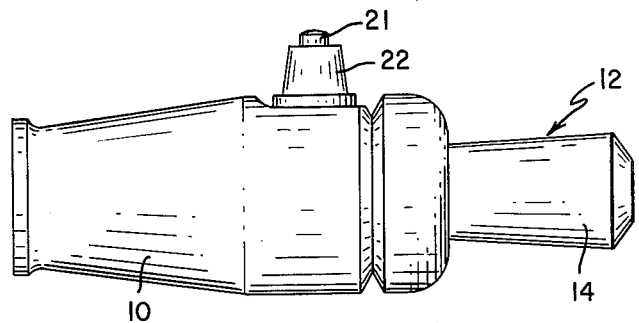
Figure 2:
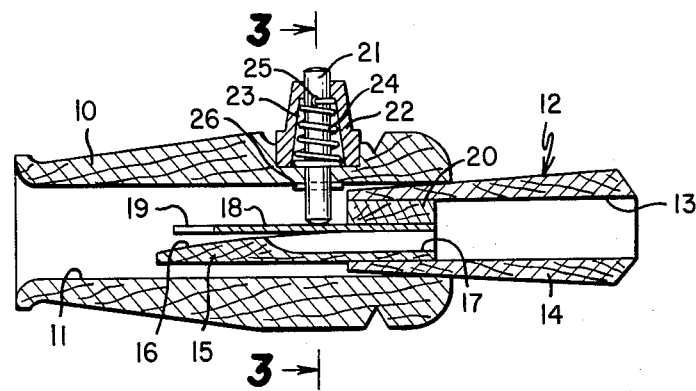
FIGURE 2 is a longitudinal sectional view of the goose caller.

The illustrated embodiment of the invention comprises an open-ended tubular mouthpiece 10 which is provided with a uniform bore. Fitting into the front end of the mouthpiece 10 is an elongate tubular sound box or tube 12 which also has a uniform bore extending from end to end. The outside of the sound box 12 is provided with an inwardly sloping wall 14, enabling the sound box 12 to be wedged into the bore 11 of the mouthpiece 10 so that a portion of the sound box extends a short distance into the bore 11.

Figure 3:
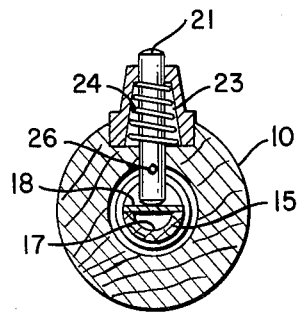
FIGURE 3 is a transverse sectional view on the line line 3—3 of FIGURE 2.
Figure 4:
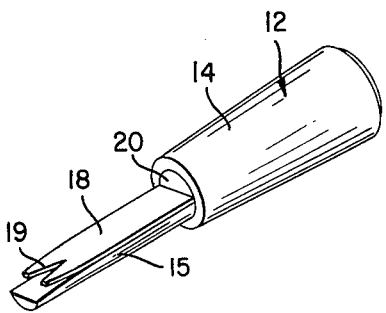
FIGURE 4 is a perspective view of the sound box or tube and associated parts.

Extending a short distance inside of the bore 13 of the sound box 12 is a tongue 15, the greater portion of which projects into the bore 11 of the mouthpiece. The tongue 15 is semi-circular in cross-section and the outer end portion has a gentle downwardly extending curve, the upper surface of which is essentially flat. Forwardly of the curved surface 16 is a groove 17 which extends to the forward end of the tongue 15. The groove 17, as indicated in FIGURE 3 is semi-circular in cross-section.

The parts above described; namely the mouthpiece 10, the sound box 12 and the tongue 15 are in this instance of wood, and I have found that red cedar is most satisfactory for the purpose, although it is to be understood that I do not limit the structure to that of wood or any particular kind of wood.

Resting on the upper side of the tongue 15 is a vibratory metallic thin reed 18, the outer end of which is notched as indicated at 19. As shown, the inner end of the reed 18 is disposed adjacent the inner end of the tongue 15 and the outer end terminates a short distance from the inner end of the tongue 15. For holding the reed 18 in the desired position and retaining the tongue 15 in the position shown, a wooden wedge 20 is forced in between the upper face of the reed 18 and the inner end portion of the sound box 12.

Disposed at substantially right angles to the reed 18 with the inner end in close juxtaposition to the upper surface of the reed is a pin 21. It will be observed that the pin 21 is spaced a short distance from the inner end of the sound box 12 so that a substantial portion of the reed projects outwardly in relation to the pin to enable it to have the desired vibratory movement relative to the tongue 15. The pin 21 extends through a frusto-conical housing 22 so that a portion of the pin projects slightly above the upper end of the housing. As shown, the housing 22 is disposed in a cavity in the mouthpiece 10 and may be adhesively secured in place. The housing 22 as a central cavity, generally conical in shape and disposed therein is a conical coil spring 24, the lower end of which seats against the mouthpiece 10 and the upper end is bent inwardly to extend into a socket formed in the pin 21 as indicated at 25, thereby to anchor the upper end of the pin. Thus the spring 24 urges the pin 21 upwardly, and this upward movement is limited by a relatively small cross pin 26 which extends through the pin 21 and is disposed within the bore 11.

In operation, a person blows directly into the mouthpiece 10 and the air causes the reed 18 rapidly to vibrate, thereby to produce the hoarse discordant tone common to geese. By depressing the pin 21, greater or less vibratory movement of the reed is permitted and thereby creating different tonal values. Thus the person will almost constantly manipulate the pin for this purpose and thereby create in rapid succession different tones. Manifestly this action must take place quickly so as to merge from one tone to another creating relatively high, medium and low tones in quick succession.

Numerous changes may be made in details of construction, arrangement and choice of materials without departing from the spirit of the invention, especially as defined in the appended claim.

What I claim is:

A goose caller comprising a tubular mouthpiece, a tubular sounding box telescoping into the forward end of said mouthpiece, a semi-cylindrical tongue disposed partly in said mouthpiece and partly in said sound box, the inner end of said tongue disposed within said sound box being longitudinally channeled at its inner end portion and tapered at its outer end portion which extends within said mouthpiece, a reed overlying the channeled portion of said tongue and said tapered portion, a wedge for retaining said tongue and said reed in said sound box, a pin slidingly disposed within said mouthpiece and having its inner end engageable with a free portion of said reed and having its outer end disposed outside of said mouthpiece, and spring means normally biasing said pin in a direction away from said reed, whereby rapid manipulation of said pin will change the tone emitted from the goose caller due to the vibratory action of said reed.

References Cited in the file of this patent

UNITED STATES PATENTS

| | | |
|---|---|---|
| 726,277 | Fuller | Apr. 28, 1903 |
| 2,730,836 | Faulk et al. | Jan. 17, 1956 |